US011857840B2

(12) United States Patent
Lee (10) Patent No.: US 11,857,840 B2
(45) Date of Patent: Jan. 2, 2024

(54) MOMENTUM MEASUREMENT DEVICE, MOMENTUM MEASUREMENT SYSTEM INCLUDING THE SAME, AND MOMENTUM MEASUREMENT METHOD USING THE SAME

(71) Applicant: AVANT SOLUTION, INC., Yongin-si (KR)

(72) Inventor: Sang Chul Lee, Yongin-si (KR)

(73) Assignee: AVANT SOLUTION, INC.

( * ) Notice: Subject to any disclaimer, the term of this patent is extended or adjusted under 35 U.S.C. 154(b) by 296 days.

(21) Appl. No.: 17/380,008

(22) Filed: Jul. 19, 2021

(65) Prior Publication Data
US 2022/0203167 A1 Jun. 30, 2022

(30) Foreign Application Priority Data
Dec. 28, 2020 (KR) .................. 10-2020-0184457

(51) Int. Cl.
*A63B 24/00* (2006.01)
*G01L 5/16* (2020.01)
*A63B 71/06* (2006.01)
*A63B 21/072* (2006.01)

(52) U.S. Cl.
CPC ........ *A63B 24/0062* (2013.01); *A63B 21/072* (2013.01); *A63B 71/0622* (2013.01); *G01L 5/16* (2013.01); *A63B 2071/0625* (2013.01); *A63B 2220/44* (2013.01); *A63B 2225/50* (2013.01)

(58) Field of Classification Search
CPC .............. A63B 24/0062; A63B 21/072; A63B 71/0622; A63B 2071/0625; A63B 2220/44; A63B 2225/50; G01L 5/16; G06V 40/23
See application file for complete search history.

(56) References Cited

U.S. PATENT DOCUMENTS

| | | | |
|---|---|---|---|
| 10,478,669 B2 * | 11/2019 | Chen | A61B 5/01 |
| 2014/0073446 A1 * | 3/2014 | Davenport | A63B 24/0006 473/223 |
| 2016/0129332 A1 * | 5/2016 | Davenport | G06V 40/23 473/223 |
| 2018/0154213 A1 * | 6/2018 | Chen | A61B 5/1122 |
| 2018/0256074 A1 * | 9/2018 | Persidsky | A61B 5/113 |
| 2022/0087575 A1 * | 3/2022 | Persidsky | G16H 40/63 |

FOREIGN PATENT DOCUMENTS

| | | |
|---|---|---|
| JP | 2018079300 A | 5/2018 |
| KR | 20170020221 A | 2/2017 |

* cited by examiner

*Primary Examiner* — Francis C Gray
(74) *Attorney, Agent, or Firm* — Renaissance IP Law Group LLP

(57) ABSTRACT

A momentum measurement device is disclosed. The momentum measurement device includes a measurement sensor including a printed circuit board and an acceleration sensor, a gyroscope sensor, a communication element, and a processor connected to the printed circuit board, and a cover configured to surround a first surface and a side surface of the measurement sensor.

15 Claims, 7 Drawing Sheets

MOMENTUM MEASUREMENT DEVICE, MOMENTUM MEASUREMENT SYSTEM INCLUDING THE SAME, AND MOMENTUM MEASUREMENT METHOD USING THE SAME

This application claims the benefit of Korean Patent Application No. 10-2020-0184457, filed on Dec. 28, 2020, which is hereby incorporated by reference as if fully set forth herein.

BACKGROUND

Technical Field

Embodiments relate to a momentum measurement device, a momentum measurement system including the same, and a momentum measurement method using the same, and more particularly to a momentum measurement device fixed to a kettlebell to measure momentum of a user, a momentum measurement system including the same, and a momentum measurement method using the same.

Discussion of the Related Art

There is a mode in which momentum or consumed calories are estimated/calculated using a biosensor, such as an electromyography sensor, a heart rate sensor, a blood sensor, or a body temperature sensor, in order to measure momentum of people. In this mode, a corresponding sensor must be attached to the body of a user, who is an exercise subject, in order to measure an electromyogram, blood, or body temperature, whereby the user may feel inconvenienced during exercise.

In another mode, vibration or translation generated while the user exercises is sensed using a specific sensor, and momentum or consumed calories of the user are estimated/calculated based on the vibration or the translation (e.g. a pedometer). In this mode, however, exercise performed by the user must be very simplified in order to estimate/calculate momentum of the user, whereby the estimated/calculated value is not accurate. In addition, there is limitation in reflecting various shapes, postures, and kinds of exercise performed by the user.

In particular, workout in gyms, etc. is frequently impossible due to the COVID-19 pandemic. For this reason, home training has been popularized. When exercising at home without help of a trainer, it is necessary to accurately measure momentum or exercise posture.

SUMMARY

Embodiments provide a momentum measurement device capable of enabling a user who exercises using exercise equipment, such as a kettlebell, to check their exercise posture and momentum, a momentum measurement system including the same, and a momentum measurement method using the same.

In one embodiment, a momentum measurement device includes a measurement sensor including a printed circuit board and an acceleration sensor, a gyroscope sensor, a communication element, and a processor connected to the printed circuit board and a cover configured to surround a first surface and a side surface of the measurement sensor.

The cover may include a cover body and fixing portions protruding from at least three regions of the edge of the cover body.

The momentum measurement device may further include a magnet embedded in each of the fixing portions.

A first surface of each of the fixing portions may be connected to a first surface of the cover body, and a side surface of each of the fixing portions may separably contact the cover body.

A second surface of the cover body and a second surface of each of the fixing portions may have negative curvatures, and the second surface of the cover body and the second surface of each of the fixing portions may be surfaces opposite the first surface of the cover body and the first surface of each of the fixing portions, respectively.

Each of the fixing portions may be provided in the first surface and the second surface thereof with a first hole and a second hole, respectively, the size of the first hole may be greater than the size of the second hole, and the first surface of each of the fixing portions may be a surface opposite the second surface of each of the fixing portions.

In another embodiment, a momentum measurement system includes the momentum measurement device and a wireless terminal paired with the momentum measurement device, wherein the wireless terminal includes a communication unit configured to receive data about movement of exercise equipment having the measurement sensor attached thereto from the momentum measurement device, a calculation unit configured to calculate movement of the measurement sensor from data of the acceleration sensor and the gyroscope sensor in the measurement sensor received from the communication unit, a determination unit configured to compare the movement of the measurement sensor with predetermined motion beat information, and an output unit configured to output the result of comparison between the movement of the measurement sensor and the predetermined motion beat information.

The predetermined motion beat information may be a multiple of 40 beats per minute (BPM).

The output unit may be an audio output unit or a video output unit.

The exercise equipment having the measurement sensor attached thereto may be a kettlebell.

The movement of the measurement sensor may be swing, jerk, double cycle, or a combination of swing, jerk, and double cycle.

In a further embodiment, a momentum measurement method includes fixing a momentum measurement device including an acceleration sensor and a gyroscope sensor to exercise equipment to measure movement of the exercise equipment, transmitting measurement values of the acceleration sensor and the gyroscope sensor to a wireless terminal, calculating, by the wireless terminal, movement of a measurement sensor from the measurement values of the acceleration sensor and the gyroscope sensor, and comparing the movement of the measurement sensor with predetermined motion beat information.

The momentum measurement method may further include outputting, by the wireless terminal, the result of comparison between the movement of the measurement sensor and the predetermined motion beat information.

The movement of the measurement sensor may be acquired by a user moving a kettlebell having the measurement sensor fixed thereto based on swing, jerk, double cycle, or a combination of swing, jerk, and double cycle.

In the fixing a momentum measurement device including an acceleration sensor and a gyroscope sensor to exercise equipment to measure movement of the exercise equipment, the predetermined motion beat information may be output from the wireless terminal.

BRIEF DESCRIPTION OF THE DRAWINGS

Arrangements and embodiments may be described in detail with reference to the following drawings in which like reference numerals refer to like elements and wherein.

DETAILED DESCRIPTION

Reference will now be made in detail to embodiments, examples of which are illustrated in the accompanying drawings.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under," "under the element" as well as "on the element" may be included based on the element.

Figure 1A:
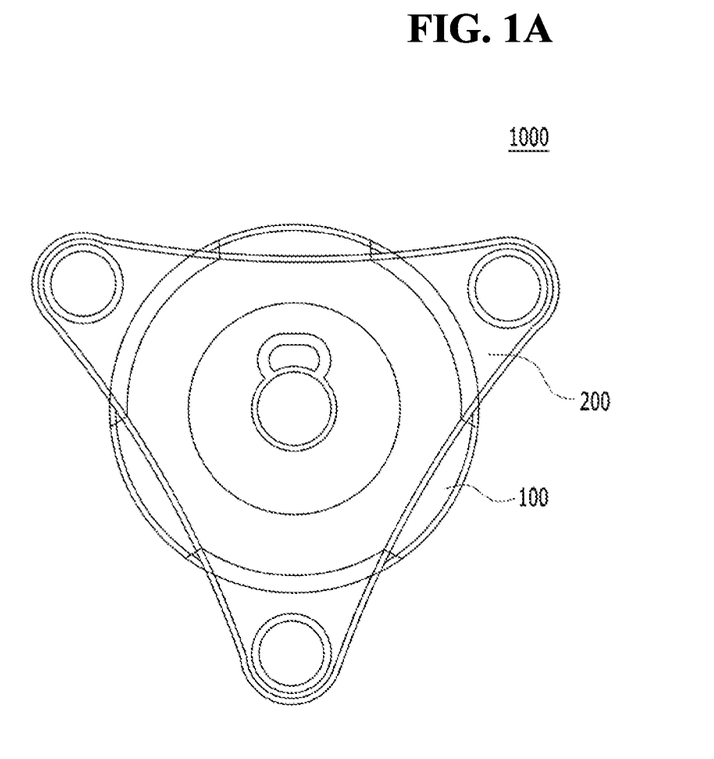
FIGS. 1A and 1B are views showing a momentum measurement device according to an embodiment.
Figure 1B:
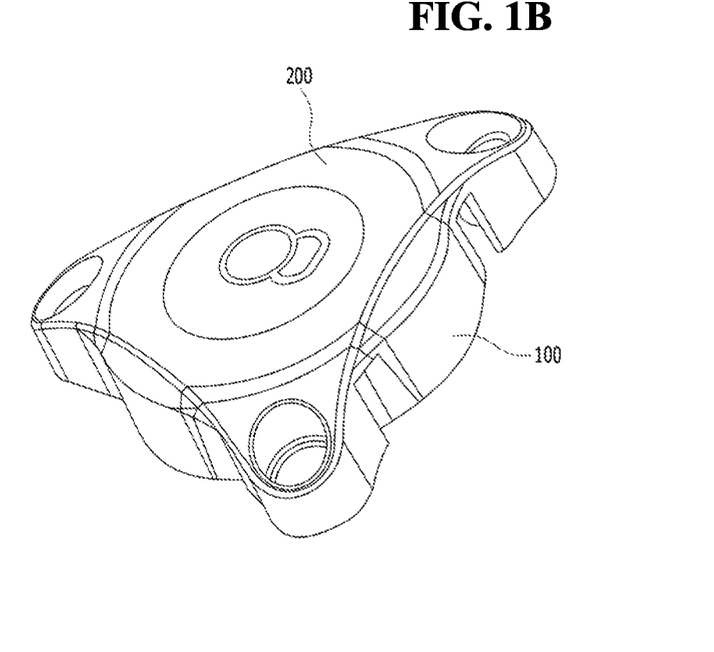

FIGS. 1A and 1B are views showing a momentum measurement device according to an embodiment.

The momentum measurement device 1000 according to this embodiment may include a measurement sensor 100 and a cover 200. FIG. 1A is a plan view of the momentum measurement device 1000, and FIG. 1B is a perspective view of the momentum measurement device 1000.

The measurement sensor 100 may be fixed to a kettlebell to measure the movement trajectory of the kettlebell when a user exercises with the kettlebell. The cover 200 may fix the measurement sensor 100 to the kettlebell.

Figure 2:
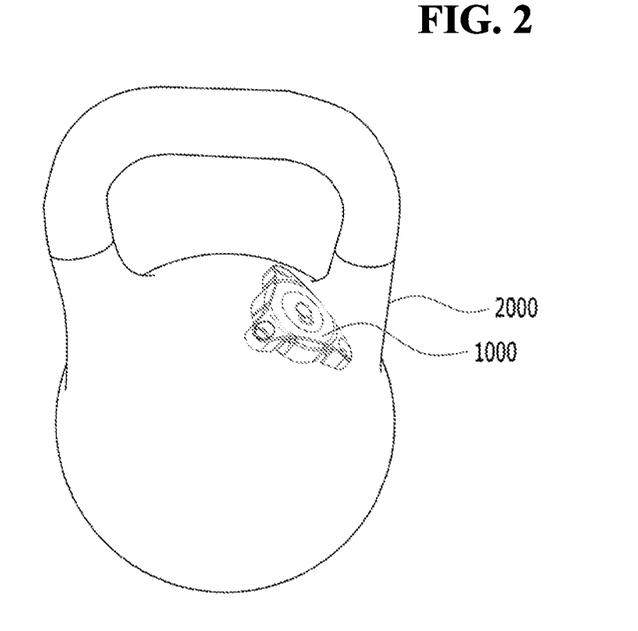
FIG. 2 is a view showing the state in which the momentum measurement device according to the embodiment is fixed to exercise equipment.

FIG. 2 is a view showing the state in which the momentum measurement device according to the embodiment is fixed to exercise equipment.

The measurement sensor 100 is fixed to a kettlebell 2000, and the kettlebell 2000 is shown as an example of the exercise equipment. However, the disclosure is not limited thereto. The momentum measurement device according to the embodiment may be attached to another kind of exercise equipment so as to measure the movement trajectory of the exercise equipment in order to measure momentum of the user.

Figure 3A:
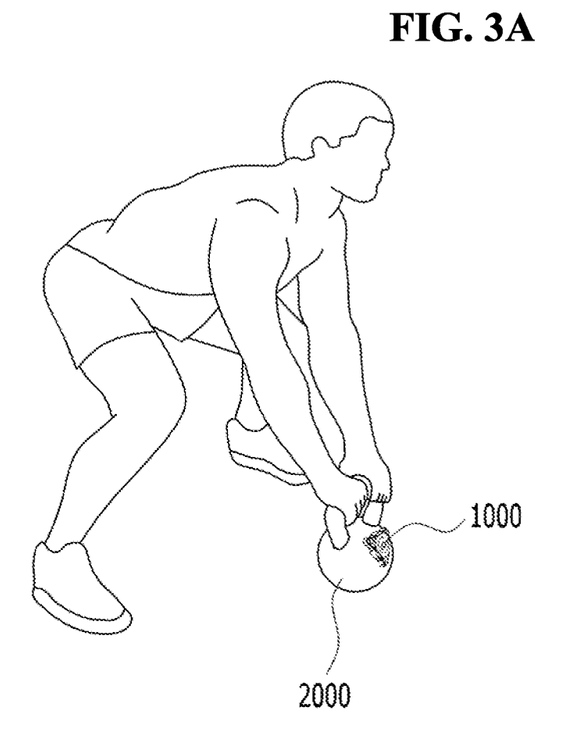
FIGS. 3A to 3C are views showing an embodiment of exercise with the exercise equipment of FIG. 2.
Figure 3B:
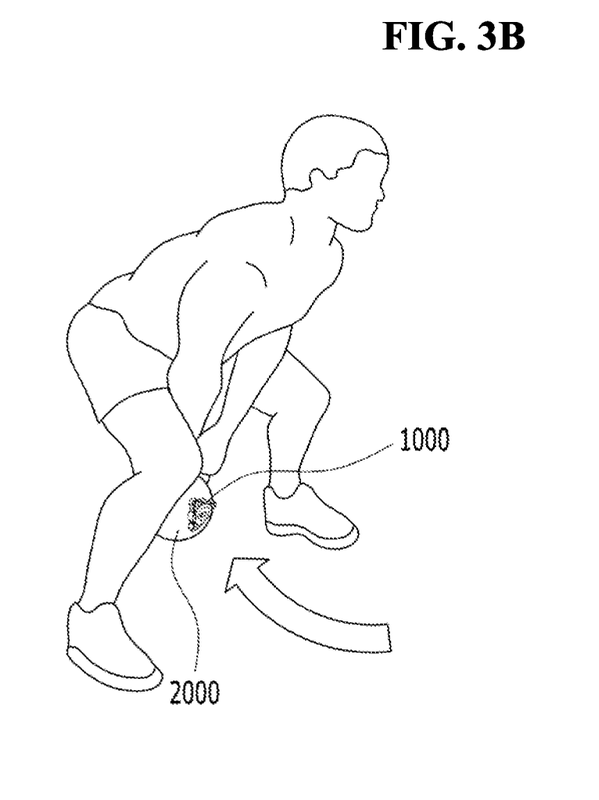
Figure 3C:
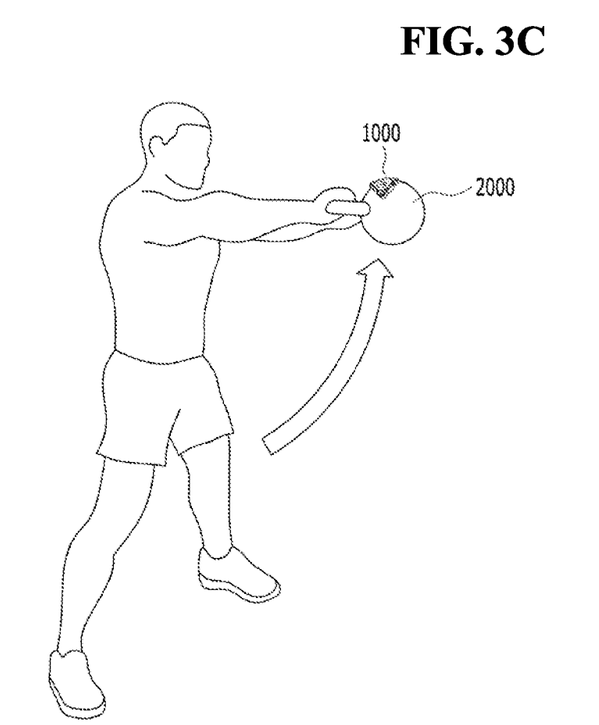

FIGS. 3A to 3C are views showing an embodiment of exercise with the exercise equipment of FIG. 2.

As shown in FIGS. 3A and 3B, the user moves the kettlebell 2000, to which the momentum measurement device 1000 is fixed, front to back. The motion in which the user moves the kettlebell 2000 front to back may be called "swing."

As shown in FIG. 3C, the user raises the kettlebell 2000, to which the momentum measurement device 1000 is fixed, to the shoulder height of the user. This motion may be called "up."

In addition, a combination of motions shown in FIGS. 3A to 3C may be called "swing" or "swing up."

Although not shown, the user may raise the exercise equipment, such as the kettlebell 2000, above the head of the user from the shoulder height of the user shown in FIG. 3C. This motion may be called "jerk."

Hereinafter, the construction of the momentum measurement device, the construction of a momentum measurement system including the same, and a momentum measurement method using the same will be described in detail with reference to FIGS. 4 to 8.

Figure 4:
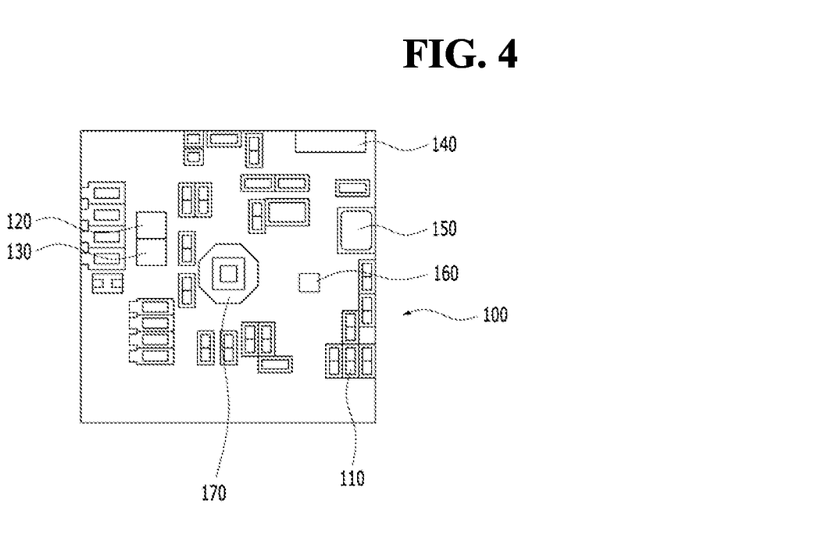
FIG. 4 is a view showing a portion of a measurement sensor of the momentum measurement device according to the embodiment.

FIG. 4 is a view showing a portion of the measurement sensor of the momentum measurement device according to the embodiment.

FIG. 4 shows the internal construction of the measurement sensor 100 of the momentum measurement device 1000 shown in FIG. 1A and other figures. Specifically, the measurement sensor 100 may include a printed circuit board 110 and an acceleration sensor 120, a gyroscope sensor 130, a communication element 140, and a processor 160 connected to the printed circuit board 110. The measurement sensor 100 may further include a switch 170 and a balun filter 150.

The printed circuit board 110 may be a board to which the acceleration sensor 120 and various kinds of resistance elements not shown in FIG. 4 are electrically connected. In consideration of the fact that the kettlebell 2000, to which the momentum measurement device 1000 is fixed, is spherical, the printed circuit board 110 may be a flexible printed circuit board.

The acceleration sensor 120 is a sensor configured to measure the magnitude of acceleration or impact of a moving object. In this embodiment, the acceleration sensor 120 may measure the magnitude of acceleration or impact of the kettlebell 2000.

The gyroscope sensor 130 is a sensor using the principle of angular momentum. A shaft of a wheel of the gyroscope sensor 130 is connected to a triple ring such that the gyroscope sensor 130 is rotatable in any direction. In this embodiment, the gyroscope sensor 130 is used to measure the movement direction of the kettlebell 2000. That is, since the acceleration sensor 120 accurately senses straight motion but not circular motion, the gyroscope sensor 130 is used with the acceleration sensor 120 in order to accurately measure the movement trajectory of the kettlebell 2000.

The communication element 140 may perform wireless communication between a wireless terminal 3000 of the momentum measurement system, a description of which will follow, and the momentum measurement device 1000. Wireless communication between the momentum measurement device 1000 and the wireless terminal 3000 may be performed based on Bluetooth, Wi-Fi, radio communication, or ZigBee. However, the disclosure is not limited thereto.

The processor 160 may be an element configured to control overall operation of the measurement sensor 100.

The balun filter 150, which is an element configured to convert a signal of the communication element 140, may be included in the communication element 140.

The switch 170 is an element configured to turn on/off the momentum measurement device 1000 according to this embodiment. For example, when the momentum measurement device 1000 is separated from the kettlebell or the user stops exercising, the user may touch the switch 170 to turn off the momentum measurement device 1000.

Figure 5:
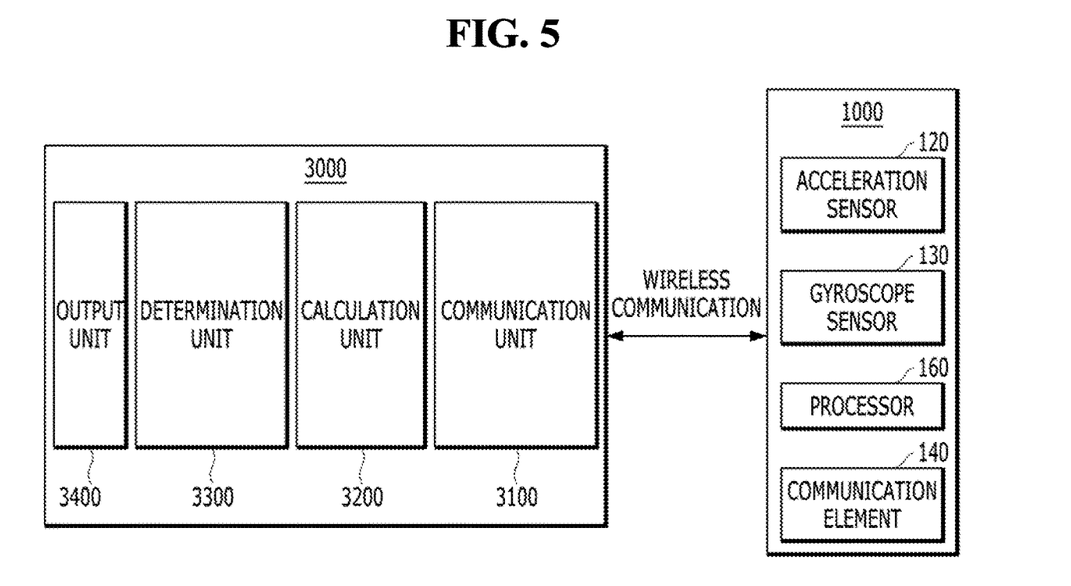
FIG. 5 is a view showing the construction of a momentum measurement system according to an embodiment.

FIG. 5 is a view showing the construction of a momentum measurement system according to an embodiment.

The momentum measurement system according to this embodiment may include a momentum measurement device 1000 and a wireless terminal 3000. The momentum measurement device 1000 may be the momentum measurement device according to the above embodiment described above, and may include a measurement sensor 100 and a cover 200.

The wireless terminal 3000 may receive a signal from the momentum measurement device 1000 and may analyze the signal in order to analyze the movement trajectory of the kettlebell. For example, the wireless terminal 3000 may be a smartphone, a 3G video phone, a kiosk, an Internet video telephone, a PC video softphone, a PMP, or a PDA. However, the disclosure is not limited thereto. In addition, the wireless terminal 3000 may provide exemplary motions of the kettlebell 2000 to the user or may provide comparison between the exemplary motions of the kettlebell 2000 and actual motions of the kettlebell 2000 performed by the user.

The wireless terminal 3000 may be paired with the momentum measurement device 1000. Here, "pairing" means that signals are transmitted and received through the communication element 140 and a communication unit 3100. In the case in which a wireless frequency range is set for a wireless terminal 3000, the wireless terminal 3000 may be paired with another momentum measurement device 1000 so as to be used.

The wireless terminal 3000 may include a communication unit 3100, a calculation unit 3200, a determination unit 3300, and an output unit 3400.

The communication unit 3100 may receive data measured by the acceleration sensor 120 and the gyroscope sensor 130 in the measurement sensor 100 from motion of the exercise equipment having the momentum measurement device 1000 attached thereto, i.e. the kettlebell 2000, via the communication element 140.

The calculation unit 3200 may calculate movement of the measurement sensor 100 from the data measured by the acceleration sensor 120 and the gyroscope sensor 130. The calculation unit 3200 may be a processor.

The determination unit 3300 may compare the calculated movement of the measurement sensor with predetermined motion beat information. The predetermined motion beat information may be, for example, 40 beats per minute (BPM).

That is, a program that the user follows to exercise with the kettlebell 2000, i.e. motion beat information, is displayed on the wireless terminal 3000, the movement trajectory of the kettlebell 2000 when the user actually exercises using the kettlebell 2000 is acquired, and the motion beat information is compared with the actual exercise result of the user to determine how similar the actual exercise of the user is to the exercise program of the user. The exercise program may be swing, jerk, double cycle, or a combination of swing, jerk, and double cycle. The swing and the jerk have been described above, and the double cycle may be repetition of the swing and/or the jerk.

The output unit 3400 of the wireless terminal 3000 may display the determination result of the determination unit 3300. The output unit 3400 may be an audio output unit, such as a speaker, or a video output unit, such as a screen of the wireless terminal 3000.

Figure 6A:
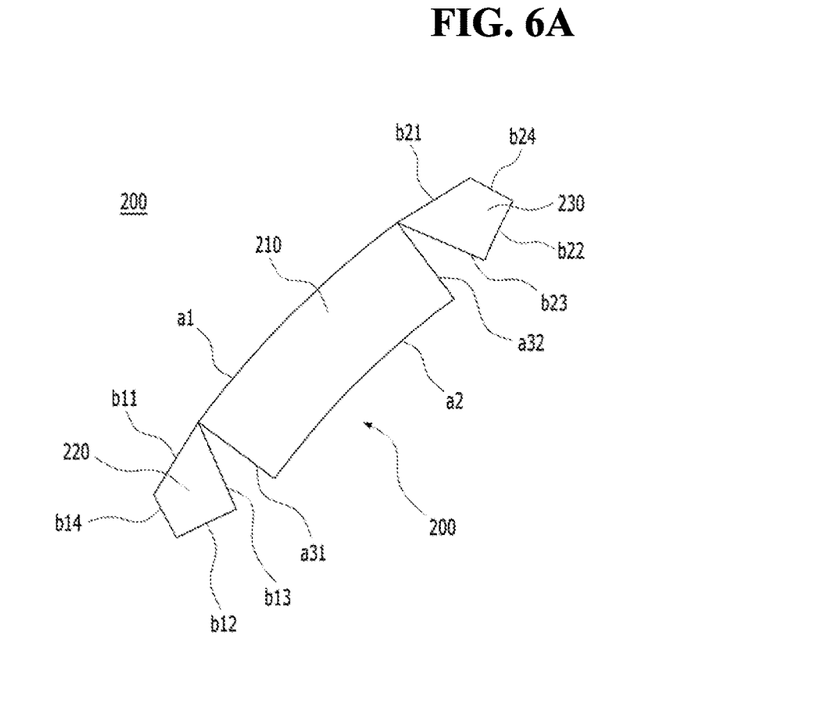
FIGS. 6A and 6B are views showing a process of fixing the momentum measurement device according to the embodiment to the exercise equipment.
Figure 6B:
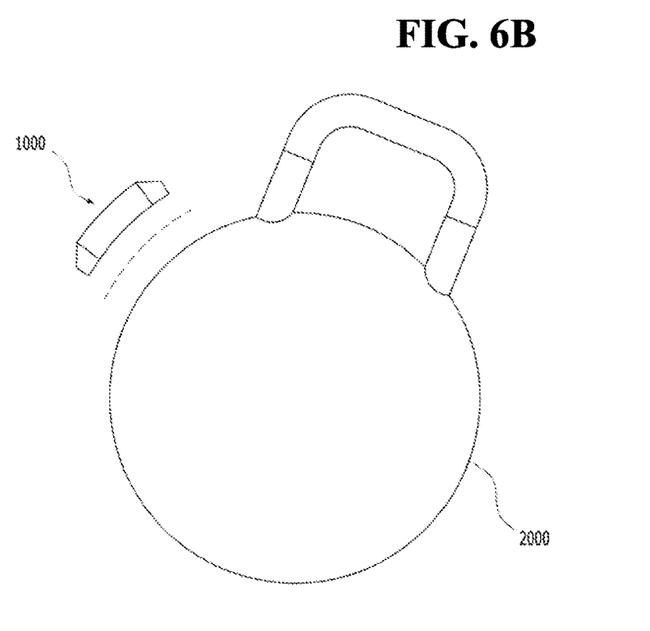

FIGS. 6A and 6B are views showing a process of fixing the momentum measurement device according to the embodiment to the exercise equipment.

Referring to FIG. 1A and other figures, the momentum measurement device according to the embodiment may include the measurement sensor 100 and the cover 200. The measurement sensor 100 may be a sensor configured such that the acceleration sensor 120 and the gyroscope sensor 130 are electrically connected to the printed circuit board 110. The cover 200 may fix the measurement sensor 100 to the kettlebell 2000.

The cover 200 may have a shape that surrounds a first surface and a side surface of the measurement sensor 100. The first surface of the measurement sensor 100 may be an upper surface, and the lower surface of the measurement sensor may face the kettlebell in contact therewith.

FIG. 6A shows the side surface of the cover 200. The cover 200 may include a cover body 210 and fixing portions protruding from at least three regions of the edge of the cover body 210. First and second fixing portions 220 and 230 are shown.

The cover body 210 and the first and second fixing portions 220 and 230 may be made of a flexible material, such as silicone. However, the disclosure is not limited thereto. In addition, the cover body 210 and the first and second fixing portions 220 and 230 may be made of a transparent material.

In FIG. 6A, a first surface a1, which is the upper surface of the cover body 210, a second surface a2, which is the lower surface of the cover body 210, and first and second side surfaces a31 and a32 are shown. The first fixing portion 220, which is adjacent to the first side surface a31 of the cover body 210, may have a first surface b11, a second surface b12, which is the lower surface thereof, and first and second side surfaces b13 and b14. The second fixing portion 230, which is adjacent to the second side surface a32 of the cover body 210, may have a first surface b21, a second surface b22, which is the lower surface thereof, and first and second side surfaces b23 and b24.

In FIG. 6A, the first surfaces b11 and b21 of the first and second fixing portions 220 and 230 may be connected to the first surface a1 of the cover body 210, and the first side surfaces b13 and b23 of the first and second fixing portions 220 and 230 may separably contact the first and second side surfaces a31 and a32 of the cover body 210.

The second surface a2 of the cover body 210 and the second surfaces b12 and b22 of the first and second fixing portions 220 and 230 may have negative curvatures, i.e. may have concave shapes.

When the momentum measurement device 1000 is fixed to the spherical kettlebell 2000, the fixing portions 220 to 230 of the cover 200 may be securely fixed to the kettlebell 2000 due to concave shapes of the second surface a2 of the cover body 210 and the second surfaces b12 and b22 of the first and second fixing portions 220 and 230. In addition, when the momentum measurement device 1000 is fixed to the kettlebell 2000, as shown in FIG. 6B, the first side surfaces b13 and b23 of the first and second fixing portions 220 and 230 may contact the first and second side surfaces a31 and a32 of the cover body 210, whereby the momentum measurement device 1000 may be securely fixed to the surface of the spherical kettlebell 2000.

Figure 7A:
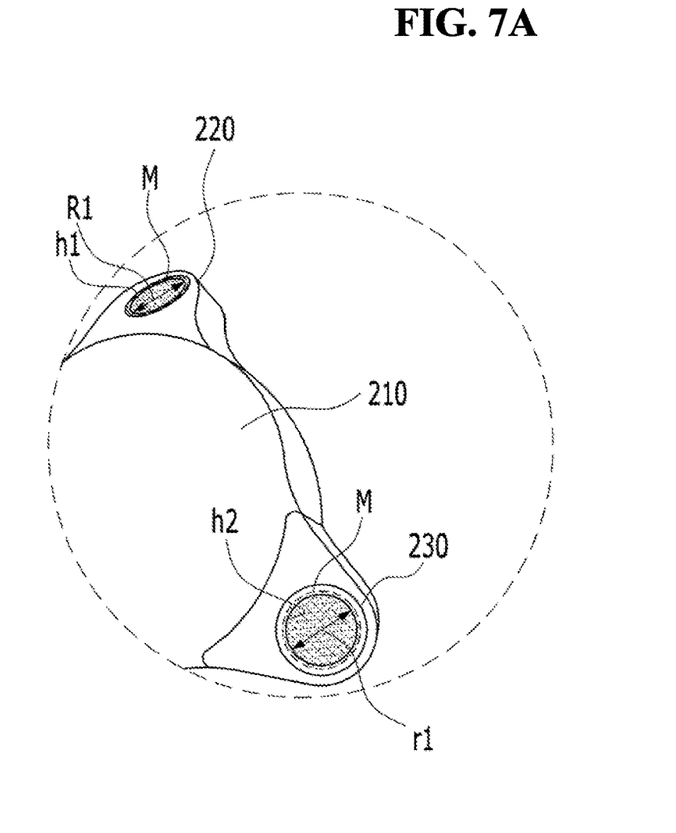
FIGS. 7A and 7B are views showing fixing portions of a cover of the momentum measurement device according to the embodiment in detail.
Figure 7B:
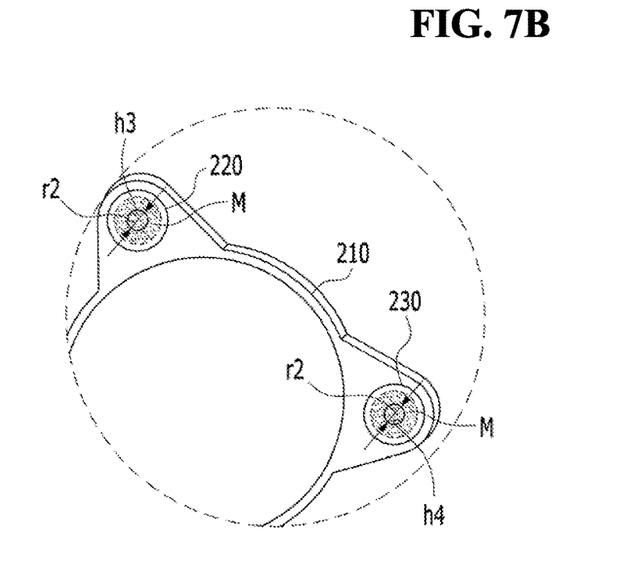

FIGS. 7A and 7B are views showing fixing portions of the cover of the momentum measurement device according to the embodiment in detail.

In this embodiment, magnets M may be inserted into the fixing portions of the cover 200, whereby the momentum measurement device 1000 may be securely fixed to the kettlebell. For example, the magnets M may be neodymium (Nd) magnets. However, the disclosure is not limited thereto.

As shown in FIG. 7A, the first surfaces, i.e. the upper surfaces, of the first and second fixing portions 220 and 230 may be provided with first holes h1 and h2, respectively, and the magnets M may be inserted into the first and second fixing portions 220 and 230 through the first holes h1 and h2, respectively.

The diameters r1 of the first holes h1 and h2 are less than the diameters of the magnets M. When the kettlebell 2000 is moved after the magnets M are inserted into the first holes h1 and h2 formed in the first and second fixing portions 220 and 230, which are made of a flexible material, therefore, the magnets M may be prevented from being easily separated from the first and second fixing portions 220 and 230 through the first holes h1 and h2, respectively.

In FIG. 7B, the second surfaces, i.e. the lower surfaces, of the first and second fixing portions 220 and 230 may be provided with second holes h3 and h4, respectively. The diameters r2 of the second holes h3 and h4 may be less than the diameters r1 of the first holes h1 and h2.

When sweat is introduced into the first holes h1 and h2 of the first and second fixing portions 220 and 230 while the user exercises with the kettlebell 2000 having the momentum measurement device 1000 attached thereto, the sweat may be mainly discharged through the second holes h3 and h4, whereby it is possible to prevent deterioration of the measurement sensor 100 including the magnets M. In addition, the second holes h3 and h4 are formed, whereby the flexible material constituting the first and second fixing portions 220 and 230 between the magnets M and the kettlebell 2000 is removed, and therefore magnetic force between the magnets M and the kettlebell 2000 may be increased.

The diameters of the first holes h1 and h2 are less than the diameters of the magnets M. When the kettlebell 2000 is moved after the magnets M are inserted into the first holes h1 and h2 formed in the first and second fixing portions 220 and 230, which are made of a flexible material, therefore, the magnets M may be prevented from being easily separated from the first and second fixing portions 220 and 230 through the first holes h1 and h2, respectively.

Figure 8:
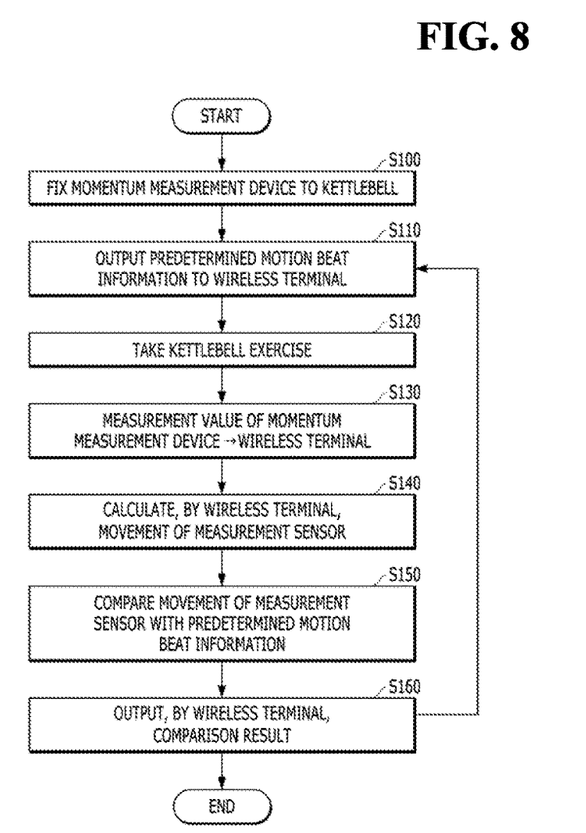
FIG. 8 is a flowchart showing a momentum measurement method according to an embodiment.

FIG. 8 is a flowchart showing a momentum measurement method according to an embodiment.

In the momentum measurement method according to this embodiment, first, a momentum measurement device including an acceleration sensor and a gyroscope sensor may be fixed to exercise equipment (S100), and predetermined motion beat information may be output to a wireless terminal (S110).

For example, beat information desired by a user or suitable for exercise with a kettlebell may be output to a speaker or a screen of a smartphone. The predetermined motion beat information may be a multiple of 40 beats per minute (BPM).

Subsequently, the user may exercise with the kettlebell having the momentum measurement device fixed thereto. For example, the exercise may be based on swing, jerk, double cycle, or a combination of swing, jerk, and double cycle. At this time, the user may move the kettlebell in response to audio or video output from the smartphone (S120). At this time, an acceleration sensor and a gyroscope sensor in a measurement sensor provided in the momentum measurement device may measure movement of the kettlebell.

In addition, during movement of the kettlebell, i.e. in the step of the user exercising, the predetermined motion beat information may be output from the wireless terminal, i.e. a sound having a predetermined rhythm or an image may be output from the smartphone, whereby the user may control exercise with the kettlebell in response to the rhythm sound or the image.

Subsequently, measurement data of the acceleration sensor and the gyroscope sensor of the momentum measurement device may be transmitted to the wireless terminal, i.e. the smartphone, through wireless communication (S130).

Subsequently, a processor provided in the wireless terminal may calculate movement of the measurement sensor 100 based on the received measurement data (S140).

Subsequently, a determination unit provided in the wireless terminal may compare the movement of the measurement sensor with the predetermined motion beat information (S150). That is, the determination unit may determine whether the predetermined motion beat information, which indicates exercise motion intended by the user, and actual motion of the kettlebell by the user coincide with each other.

Subsequently, an output unit of the wireless terminal may output the result of comparison between the movement of the measurement sensor and the predetermined motion beat information (S160). At this time, the user may check the result of their exercise with the kettlebell based on the comparison result output from a screen or a speaker of the smartphone.

In the momentum measurement device, the momentum measurement system including the same, and the momentum measurement method using the same, it is possible for the user who exercises with the exercise equipment, such as the kettlebell, to check their exercise posture and momentum, whereby it is possible for the user to effectively exercise with the exercise equipment, such as the kettlebell, at home without help of a professional trainer.

As is apparent from the above description, the momentum measurement device, the momentum measurement system including the same, and the momentum measurement method using the same have the following effects.

It is possible for the user to control the speed and direction in movement of the kettlebell in response to audio or video output from the smartphone.

Also, it is possible for the user to check their exercise posture and momentum using the acceleration sensor and the gyroscope sensor provided in the momentum measurement device attached to the kettlebell, whereby it is possible for the user to effectively exercise with the exercise equipment, such as the kettlebell, at home without help of a professional trainer.

Although embodiments have been described above, the embodiments are merely illustrations and do not limit the present disclosure, and those skilled in the art will appreciate that various modifications and applications are possible without departing from the intrinsic features of the disclosure. For example, concrete constituent elements of the embodiments may be modified. In addition, it is to be understood that differences relevant to the modifications and the applications fall within the scope of the present disclosure defined in the appended claims.

What is claimed is:
1. A momentum measurement device comprising:
   a measurement sensor comprising a printed circuit board and an acceleration sensor, a gyroscope sensor, a communication element, and a processor connected to the printed circuit board; and a cover configured to surround a first surface and a side surface of the measurement sensor, wherein the cover comprises a cover body and fixing portions protruding from at least three regions of an edge of the cover body, a second surface of the cover body and a second surface of each of the fixing portions have negative curvatures, and the second surface of the cover body and the second surface of each of the fixing portions are surfaces opposite the first surface of the cover body and the first surface of each of the fixing portions, respectively.

2. A momentum measurement device comprising:
a measurement sensor comprising a printed circuit board and an acceleration sensor, a gyroscope sensor, a communication element, and a processor connected to the printed circuit board; and
a cover configured to surround a first surface and a side surface of the measurement sensor,
wherein the cover comprises a cover body and fixing portions protruding from at least three regions of an edge of the cover body,
each of the fixing portions is provided in the first surface and a second surface thereof with a first hole and a second hole, respectively,
a size of the first hole is greater than a size of the second hole, and
the first surface of each of the fixing portions is a surface opposite the second surface of each of the fixing portions.

3. The momentum measurement device according to claim 2, further comprising a magnet embedded in each of the fixing portions.

4. The momentum measurement device according to claim 2, wherein a first surface of each of the fixing portions is connected to a first surface of the cover body, and a side surface of each of the fixing portions separably contacts the cover body.

5. A momentum measurement system comprising:
a momentum measurement device comprising:
a measurement sensor comprising a printed circuit board and an acceleration sensor, a gyroscope sensor, a communication element, and a processor connected to the printed circuit board; and
a cover configured to surround a first surface and a side surface of the measurement sensor; and
a wireless terminal paired with the momentum measurement device, wherein the wireless terminal comprises:
a communication unit configured to receive data about movement of exercise equipment having the measurement sensor attached thereto from the momentum measurement device;
a calculation unit configured to calculate movement of the measurement sensor from data of the acceleration sensor and the gyroscope sensor in the measurement sensor received from the communication unit;
a determination unit configured to compare the movement of the measurement sensor with a predetermined motion beat information; and
an output unit configured to output a result of comparison between the movement of the measurement sensor and the predetermined motion beat information.

6. The momentum measurement system according to claim 5, wherein the predetermined motion beat information is a multiple of 40 beats per minute (BPM).

7. The momentum measurement system according to claim 5, wherein the output unit is an audio output unit or a video output unit.

8. The momentum measurement system according to claim 5, wherein the exercise equipment having the measurement sensor attached thereto is a kettlebell.

9. The momentum measurement system according to claim 5, wherein the movement of the measurement sensor is swing, jerk, double cycle, or a combination of swing, jerk, and double cycle.

10. A momentum measurement method comprising:
fixing a momentum measurement device comprising an acceleration sensor and a gyroscope sensor to exercise equipment to measure movement of the exercise equipment;
transmitting measurement values of the acceleration sensor and the gyroscope sensor to a wireless terminal;
calculating, by the wireless terminal, movement of a measurement sensor from the measurement values of the acceleration sensor and the gyroscope sensor; and
comparing the movement of the measurement sensor with predetermined motion beat information.

11. The momentum measurement method according to claim 10, further comprising outputting, by the wireless terminal, a result of comparison between the movement of the measurement sensor and the predetermined motion beat information.

12. The momentum measurement method according to claim 10, wherein the movement of the measurement sensor is acquired by a user moving a kettlebell having the measurement sensor fixed thereto based on swing, jerk, double cycle, or a combination of swing, jerk, and double cycle.

13. The momentum measurement method according to claim 10, wherein, in the fixing a momentum measurement device comprising an acceleration sensor and a gyroscope sensor to exercise equipment to measure movement of the exercise equipment, the predetermined motion beat information is output from the wireless terminal.

14. The momentum measurement device according to claim 1, further comprising a magnet embedded in each of the fixing portions.

15. The momentum measurement device according to claim 1, wherein a first surface of each of the fixing portions is connected to a first surface of the cover body, and
a side surface of each of the fixing portions separably contacts the cover body.

* * * * *